March 13, 1951      S. ACKERMAN      2,545,249

APPLIANCE FOR MAKING ORTHODONTIC MODELS

Filed Feb. 24, 1948      2 Sheets-Sheet 1

INVENTOR.
Samuel Ackerman
BY
Murray, Sackhoff & Paddock
ATT'YS

March 13, 1951 S. ACKERMAN 2,545,249
APPLIANCE FOR MAKING ORTHODONTIC MODELS
Filed Feb. 24, 1948 2 Sheets-Sheet 2

INVENTOR.
Samuel Ackerman
BY
Murray, Sackhoff & Paddack
ATT'YS

Patented Mar. 13, 1951

2,545,249

UNITED STATES PATENT OFFICE 2,545,249

APPLIANCE FOR MAKING ORTHODONTIC MODELS

Samuel Ackerman, Cincinnati, Ohio

Application February 24, 1948, Serial No. 10,373

7 Claims. (Cl. 32—32)

1

The present invention relates to improvements in appliances for making orthodontic models and is particularly directed to a mechanical device with which anatomic casts of a patient's mouth are each mounted to a model base to form an orthodontic model.

The science of orthodontics has as its principal branch of endeavor, the correction of the malocclusion of teeth. As a preliminary step in the diagnosis and treatment of a patient with maloccluded teeth the orthodontist makes a permanent record model of the teeth by taking impressions of the upper and lower portions of a patient's mouth in suitable impressionable material, and from those impressions, reproducing it in plaster of Paris, or other suitable moldable material. These reproductions are referred to herein as the anatomic portions of the completed orthodontic model. As has been stated, the anatomic portion is made in two independent parts known as the mandibular cast which is a reproduction in plaster of the lower arch of a person's mouth including the associated gums and teeth, and the maxillary cast which is a duplicate of the upper arch of the patient's mouth and the teeth and gums therefor. A permanent record model is generally made by mounting the mandibulary and maxillary casts on individual model bases, and it is to the particular purpose of accurately combining the anatomic portions with the bases of these models that my invention is particularly concerned.

My invention therefore has for its principal object the provision of a novel orthodontic appliance for producing accurate permanent record models of improved appearance and balance.

Another object of the invention is to provide an orthodontic device which has a few parts associated and simply combined to produce a completely mechanical appliance for carrying out the process of making orthodontic models. Because my appliance is completely mechanical the accuracy of the completed models does not depend upon the skill of the operator and therefore the work of making orthodontic models, which has been heretofore performed by experienced operators, may with the use of my device, be given to less skilled workers without detracting from the appearance or accuracy of completed orthodontic models.

A further object of the invention is to provide in an appliance having the foregoing characteristics a simplified means for accurately positioning an anatomic portion of an orthodontic model relative to a form for receiving the molding material which ultimately forms the bases for the model.

Other objects will be apparent from the following specification and drawings which illustrate a preferred embodiment of my invention, it being understood that said invention is limited only by the appended claims.

In the drawings wherein like reference numerals indicate similar parts:

Figure 1:
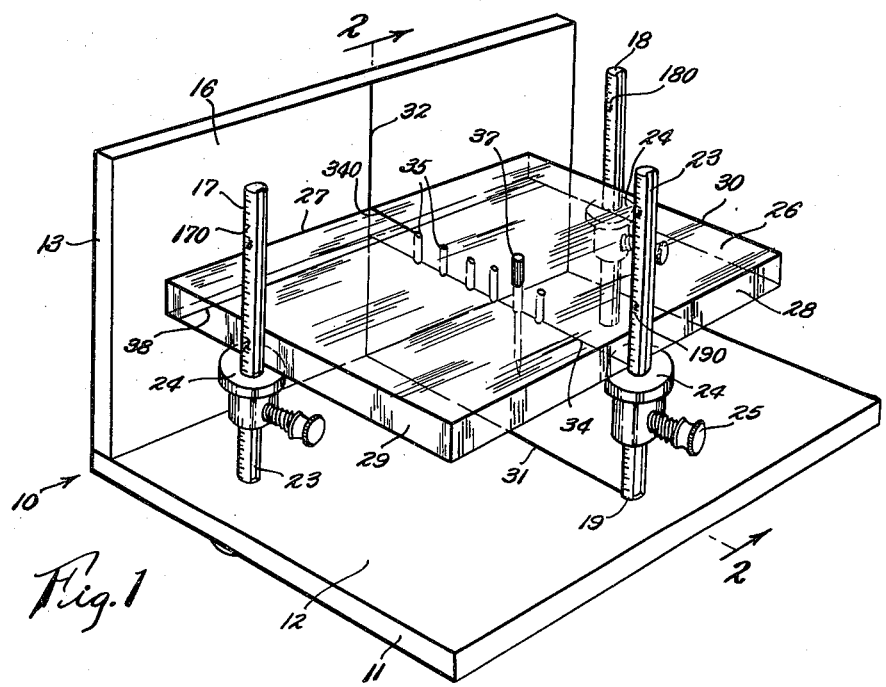
Fig. 1 is a perspective view of my appliance for making orthodontic models.
Figure 2:
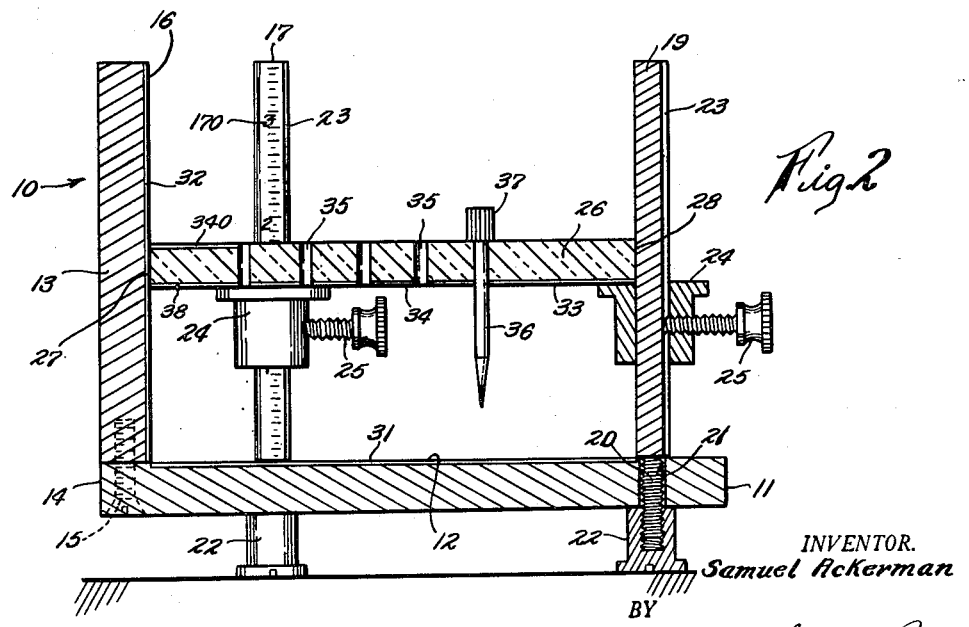
Fig. 2 is a sectional view taken on line 2—2 of Fig. 1.

With reference to Figs. 1 and 2 of the drawings the numeral 10 generally indicates my orthodontic appliance which has a base plate 11 having a flat upper surface 12 lying in a horizontal plane, and a vertically disposed back plate 13 secured to the upper rear edge portion 14 of the base plate by suitable screws 15. The back plate has a front surface 16 lying in a plane at right angles to the plane of the upper surface 12 of the base. I preferably construct the base and back plates from thick metal stock such as bronze or brass so that the unit has considerable weight to preclude displacement thereof during use. Three posts, 17, 18 and 19 are mounted upon the base plate with their axes disposed perpendicular to the top surface 12 of the base plate, and are in parallelism with the front face 16 of the back plate 13.

As indicated in Fig. 2 the posts are mounted upon the base plate by forming reduced threaded portions 20 on their lower ends and passing them through suitable bores 21 formed through the base plate, where they co-operate with interiorly threaded bores in legs 22 to secure the posts to the plate. Each post has a slot 23 formed vertically therein and has associated therewith a vertically slidable pedestal 24 which is held in vertically selected positions upon the post by a set screw 25 which is threaded in the pedestal and has its inner end receivable in the slot and guided therein for vertical movement. As it is most clearly illustrated in Fig. 1 the length dimensions of the posts 17, 18 and 19 are identically marked off in 1/16 inch calibrations up to a height of 3½ inches as is indicated by reference numerals 170, 180, and 190, so that each of the pedestals may be quickly moved to identical vertical positions relative to the surface 12 of the base to provide supporting surfaces for the plate all lying in the same horizontal plane.

An anatomic supporting plate 26 is mounted between the posts and upon the pedestals 24, and as most clearly illustrated in Fig. 2, the rear edge 27 of said plate lies flush against the vertical surface 16 of the rear plate 13 whilst the front edge 28 is parallel to the rear edge and lies flush against the vertical post 19. The side edges 29 and 30 of the supporting plate are parallel to each other and respectively engage the sides of posts 17 and 18. The plate is preferably constructed from thick, transparent material such as methyl methacrylate, glass, or the like, and it will be noted that when in operative supported position said plate will be precluded from endwise or edgewise movement by the triangular disposition of the three posts relative to the rear plate 13.

A horizontal center line 31 is inscribed in the upper surface 12 of the base plate, said line being equidistant in all its parts from the posts 17 and 18, bisecting the axis of post 19 and perpendicular to the tray positioning front surface 16 on the back plate 13. A vertical center line 32 is inscribed in the front surface 16 of the rear plate 13, said line being parallel to the axis of the posts and intersecting the center line 31 in the base plate.

Figure 7:
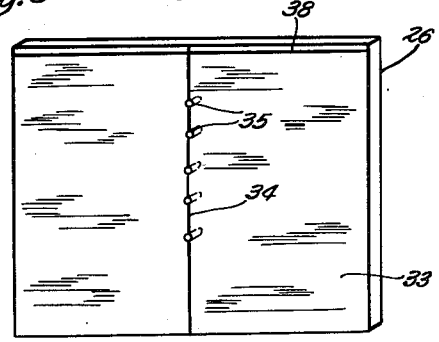
Fig. 7 is a perspective view of the anatomic mounting plate for my appliance.

As most clearly illustrated in Fig. 7 the lower surface 33 of the anatomic supporting plate 26 has a center line 34 inscribed therein which intersects the axis of the vertical post 19 and the vertical center line 32 in the rear plate 13, said center line being parallel to the horizontal center line 31 when the pedestals are set in identical spaced positions above the base plate 11. A number of equispaced holes 35 are formed vertically through the plate 26 and have their axes lying in the center line 34 of the plate, said holes being adapted to snugly receive the shank portions 36 of suitable styles 37. The anatomic supporting plate also has a crossline 38 formed in the bottom surface thereof which is centrally intersected by the center line 34 at an angle of 90°. As illustrated in Figs. 1 and 7 said crossline 38 is spaced from and parallel to the front surface 16 of the back plate 13. A short reference line 340 may be inscribed in the upper surface of the plate 26 which intersects the reference line 32 in the surface 16 and extends from the edge 27 of the plate to the rearmost of the series of holes 35.

Figure 8:
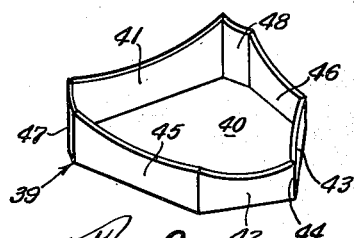
Fig. 8 is a perspective view of a preferred model base forming tray for use with my orthodontic appliance.

A typical tray 39 which is to be used with my appliance for molding the model bases for the orthodontic model is most clearly illustrated in Fig. 8 wherein said tray has a flat bottom 40, a vertical back wall 41, and opposed, converging front walls 42 and 43 which intersect at a centrally located, vertical edge 44. The side walls interconnecting the back and front walls may have various shapes but as illustrated in Fig. 8, an opposed pair of side walls 45 and 46 diverge rearwardly from the front walls 42 and 43 respectively, which in turn, are connected at their rear edges to the back wall by short converging walls 47 and 48 respectively. All the walls have concave top edges and it will be noted that the rear wall has the greatest height, whilst the side walls and front walls progressively decrease in height from the back portion to the front of the tray. It will also be noted that the reference line 38 in the supporting plate 26 is spaced from the rear edge 27 thereof a distance equal to the thickness of the back wall 41 of the tray, for purposes to be presently described.

Figure 3:
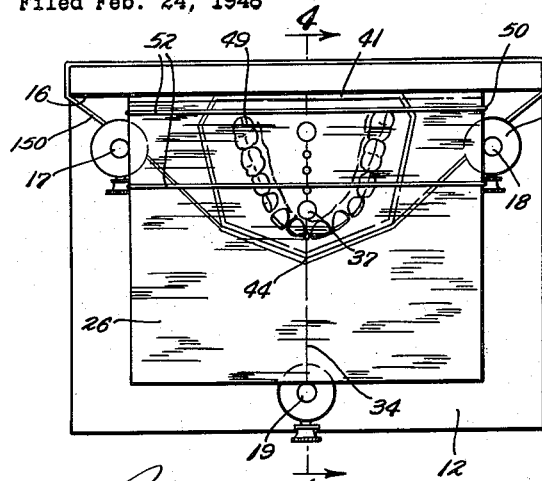
Fig. 3 is a top plan view of my appliance in position to mold a model base on the maxillary cast, wherein a showing of unset plaster, which upon hardening, forms said model base, is omitted from within the tray for purposes of clarity.
Figure 4:
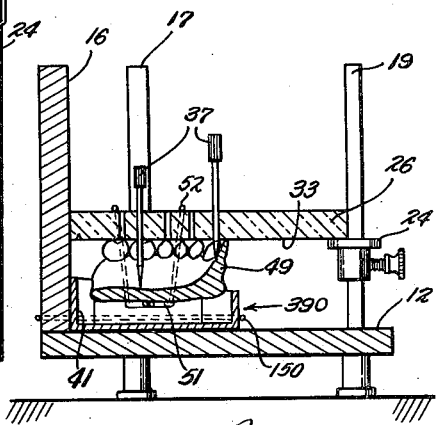
Fig. 4 is a section taken on line 4—4 of Fig. 3.

To more fully understand the functions of my appliance a brief description of the manner in which it is preferably used will now be given with particular references to Figs. 3–8 of the drawings. The model base is first molded to the maxillary anatomic portion of the model and to this end, as indicated in Figs. 3 and 4, the pedestals 24 on each of the three posts are adusted to an equal, predetermined height relative to the surface 12 of the base plate 11. In general the overall height of the anatomic portion should be two-thirds of the over-all height of the completed model for that portion, and accordingly the pedestals may be set in vertical positions spaced from the base a distance totalling the over-all height of the anatomic portion, a third of said over-all height and the thickness of the bottom wall of the tray. With the supporting plate removed from the device the maxillary anatomic portion 49 is clamped to it with the points of the teeth in contact with the under surface 33 thereof by means of an encircling rubber band 50 which preferably has its lower reaches 51 crossed under the anatomic portion and has its upper reaches 52 extending in spaced relation across the top of the plate. The median line of the anatomic portion 49 is thereafter brought into vertical alignment with the center line 34 in the plate by inserting two styles 37 in selected holes 35 so that the points thereof rest upon the mid-line of the maxilla or hard palate of the anatomic portion. Care should also be taken to properly space the anatomic portion in front of the crossline 38 which represents the thickness of the back wall of the tray that forms the base for said anatomic portion. The tray 39 filled with unset plaster is then positioned upon the surface 12 of the base with its back wall 41 flush with the surface 16 by means of a rubber band 150. The tray is adusted so that its front edge 44 is in vertical alignment with the center line 31 in the base. Thereafter the supporting plate is placed upon the pedestals with the anatomic portion supported in position against its lower surface by the rubber band 50. The device is then in the condition illustrated in Figs. 3 and 4 whereupon the plaster is allowed to harden. Just prior to final setting of the plaster the band 50 is cut and removed, and upon final setting of said plaster a model base is formed for the maxillary anatomic portion 49, which is shown in Fig. 6 as that part of the then inverted maxillary part of the model that is disposed within and molded by the tray 39.

Figure 5:
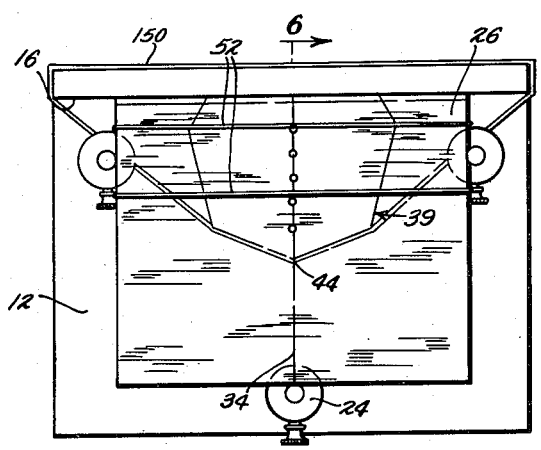
Fig. 5 is a plan view of my appliance in position to mold a model base on the mandibulary cast, wherein a showing of unset plaster, which upon hardening forms said model base, has been omitted from within the lower tray for purposes of clarity.
Figure 6:
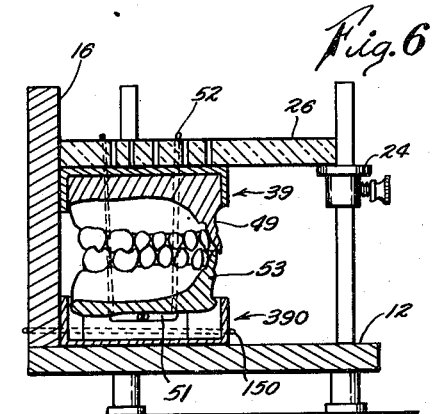
Fig. 6 is a section taken on line 6—6 of Fig. 5.

The next step is the molding of the art portion of the mandibular anatomic portion and consists in removing the supporting plate 26 from the appliance and positioning the finished maxillary portion of the model, still in its tray, against the underside of the supporting plate with the bottom of the tray flush with said surface (Figs. 5 and 6). The teeth of the mandibular anatomic portion 53 of the model are then positioned in occlusion with the teeth of the maxillary portion 49 and again the rubber band 50 is placed around the occluded anatomic portions and the plate in the manner already described. The edge 44 of the tray is then aligned with the reference line 34 in the plate with its wall 41 brough flush with the plate edge 27. The pedestals 24 are then moved upwardly and clamped on their respective posts in equidistant positions from the surface 12, said distance being twice the distance of their original setting for making the maxillary portion of the model. Another tray 390 filled with the unset plaster is positioned upon the surface 12 of the base plate 11 by the rubber band 150 with its central edge 44 in alignment with the center line 31, and its rear wall 41 flush against the surface 16. The plate 26, with its suspended occluded anatomic portions, is then placed upon the pedestals in the position illustrated in Figs. 5 and 6, wherein it will be noted that the front edge 44 of the tray for the maxillary portion of the model is in vertical alignment with the center line 34 in the supporting plate and the rear wall 41 thereof is flush against the vertical surface 16 of the back plate. The appliance is then in the condition shown in Figs. 5 and 6 and it remains in said condition until just prior to final setting of the model base in the tray when the rubber band 50 is cut and removed from the device. Thereafter the trays are removed from the finished maxillary and mandibular model bases and the surfaces of the completed model, trimmed and polished in the usual manner.

What is claimed is:

1. In an orthodontic appliance a base having a planar upper surface, a back plate secured to the base and having a front planar surface normal to the upper surface of the base, posts fixed to the base with each of their longitudinal axes perpendicular to the upper surface of said base, a pedestal adjustably mounted for axial sliding movement on each of the posts, a supporting plate upon the pedestals and positioned against edgewise movement between the posts and the front planar surface of the back plate, and perpendicularly aligned reference lines inscribed in the adjacent faces of the planar surface of the base and the supporting plate and each disposed at right angles to the planar surface of the back plate.

2. In an orthodontic appliance, a base having a tray supporting, planar surface, a back plate secured to the base and having a tray positioning planar surface normal to the tray supporting surface, said surface having a tray positioning reference line inscribed therein at right angles to the tray positioning planar surface, posts fixed to the base with each of their longitudinal axes perpendicular to the tray supporting surface, a work supporting plate positioned between the posts and the tray positioning planar surface and having a work positioning reference line inscribed therein at right angles to said planar surface and in perpendicular alignment with the tray reference line, work plate supporting pedestals mounted for axial sliding movement on each of the posts, and means on each pedestal for securing it in a predetermined position upon its respective post.

3. In an orthodontic appliance a base having a tray supporting, planar surface, a back plate secured to the base and having a tray positioning planar surface normal to the tray supporting surface, said surface having a tray positioning reference line inscribed therein at right angles to the tray positioning planar surface, posts fixed to the base with each of their longitudinal axes perpendicular to the tray supporting surface, a transparent work supporting plate positioned between the posts and the tray positioning planar surface and having a work positioning reference line inscribed therein at right angles to said planar surface and in perpendicular alignment with the tray reference line, work plate supporting pedestals mounted for axial sliding movement on each of the posts, and means on each pedestal for securing it in a predetermined position upon its respective post.

4. In an orthodontic appliance a base having a tray supporting, planar surface, a back plate secured to the base and having a tray positioning planar surface normal to the tray supporting surface, said tray supporting surface having a tray positioning reference line therein disposed at right angles to the tray positioning planar surface, a pair of posts fixed perpendicularly upon the base in spaced relation to the tray positioning planar surface and disposed on opposite sides of the reference line, a third post fixed perpendicularly upon the base relatively remote from the tray positioning planar surface and disposed adjacent the said reference line, a transparent work supporting plate positioned against edgewise movement between the posts and the tray positioning planar surface, and having a work positioning reference line therein in perpendicular alignment with the tray reference line, a work plate supporting pedestal mounted for axial sliding movement on each of the posts, and means on each pedestal for securing it in a predetermined position upon its respective post.

5. In an orthodontic appliance, a base having a tray supporting, planar surface, a back plate secured to the base and having a tray positioning, planar surface normal to the tray supporting surface, said tray supporting surface having a center line therein perpendicular to the tray positioning surface, posts fixed to the base with each of their longitudinal axes perpendicular to the tray supporting surface, a work supporting plate positioned against edgewise movement between the posts and the tray positioning surface and having a center line therein perpendicular to the center line in the tray positioning planar surface of the base, the plate having a row of equally spaced style receiving openings formed therethrough, said holes having their axes lying in the center line in the tray, and a cross line in the work supporting plate spaced from and parallel to the tray positioning surface.

6. An appliance for making orthodontic models having mandibular and maxillary anatomic casts mounted on individual model bases comprising a base plate having a planar surface for supporting a model base forming tray, a back plate secured to the base plate and having a tray positioning planar surface normal to the tray supporting surface, said tray supporting surface having a center line therein disposed perpendicular to the tray positioning surface in the back plate, posts fixed to the base plate with each of their longitudinal axes perpendicular to the tray supporting surface, an anatomic cast supporting plate positioned against edgewise movement between the posts and the tray positioning surface, and having a center line therein in perpendicular alignment with the center line in the base plate, anatomic plate supporting pedestals mounted for axial, sliding movement on each of the posts, and means on each pedestal for securing it in a predetermined position upon its respective post.

7. An appliance for making orthodontic models having mandibular and maxillary anatomic casts mounted on individual model bases comprising a base having a planar surface for supporting a model base forming tray, a back plate secured to the base plate and having a tray positioning planar surface normal to the tray supporting surface, said tray supporting surface having a center line therein disposed perpendicular to the tray positioning surface of the back plate, posts fixed to the base with each of their longitudinal axes perpendicular to the tray supporting surface, and anatomic cast supporting plate positioned against edgewise movement between the posts and the tray positioning surface, and having a center line therein in perpendicular alignment with the center line in the base plate, said anatomic cast supporting plate having a row of equally spaced, style receiving openings formed therethrough with each of their axes lying in the center line in the said plate, and a cross line in the said supporting plate spaced from and parallel to the tray positioning surface, anatomic plate supporting pedestals mounted for axial, sliding movement on each of the posts, and means on each pedestal for securing it in a predetermined position upon its respective post.

SAMUEL ACKERMAN.

REFERENCES CITED

The following references are of record in the file of this patent:

UNITED STATES PATENTS

| Number | Name | Date |
|---|---|---|
| 686,613 | Huberty | Nov. 12, 1901 |
| 973,408 | Corcoran | Oct. 18, 1910 |
| 1,546,667 | Lentz | July 21, 1925 |
| 1,670,311 | Musante | May 22, 1928 |
| 1,736,006 | Hagman | Nov. 19, 1929 |
| 1,906,797 | Lentz | May 2, 1933 |

OTHER REFERENCES

The Gysi Trubyte Articulator, publication of The Dentists' Supply Company of New York (copyright 1928) page 9.